(12) United States Patent
Wyatt

(10) Patent No.: US 9,307,179 B1
(45) Date of Patent: Apr. 5, 2016

(54) METHOD AND SYSTEM FOR PROTECTING CONTENT IN GRAPHICS MEMORY

(75) Inventor: David Wyatt, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2584 days.

(21) Appl. No.: 11/939,475

(22) Filed: Nov. 13, 2007

(51) Int. Cl.
*H04N 5/445* (2011.01)
*H04N 21/80* (2011.01)
*H04N 21/431* (2011.01)
*H04N 7/16* (2011.01)
*H04N 21/81* (2011.01)

(52) U.S. Cl.
CPC ........... *H04N 5/44504* (2013.01); *H04N 7/163* (2013.01); *H04N 21/4318* (2013.01); *H04N 21/8146* (2013.01)

(58) Field of Classification Search
USPC .................................. 345/530, 536–538, 629
See application file for complete search history.

(56) References Cited

U.S. PATENT DOCUMENTS

| | | | |
|---|---|---|---|
| 7,114,168 B1 | 9/2006 | Wyatt et al. | |
| 7,203,310 B2 * | 4/2007 | England et al. | 380/200 |
| 7,281,272 B1 * | 10/2007 | Rubin et al. | 726/26 |
| 7,474,312 B1 | 1/2009 | Rohrer et al. | |
| 7,530,084 B2 * | 5/2009 | Dawson | 725/25 |
| 7,680,999 B1 | 3/2010 | Morris et al. | |

OTHER PUBLICATIONS

Office Action for U.S. Appl. No. 11/939,478, dated May 21, 2010.
Office Action mailed Nov. 3, 2011, U.S. Appl. No. 11/939,475.

* cited by examiner

*Primary Examiner* — Joni Richer
(74) *Attorney, Agent, or Firm* — Artegis Law Group, LLP

(57) ABSTRACT

A method and system for protecting content in graphics memory are disclosed. Specifically, one embodiment of the present invention sets forth a method, which includes the steps of storing a first privilege level in a privilege map with restricted access, wherein the first privilege level is associated with a memory page used to store the content; and determining whether to permit a request to access the memory page based on the first privilege level.

22 Claims, 9 Drawing Sheets

METHOD AND SYSTEM FOR PROTECTING CONTENT IN GRAPHICS MEMORY

BACKGROUND OF THE INVENTION

1. Field of the Invention

Embodiments of the present invention relate generally to memory management techniques and more specifically to a method and system for protecting content in graphics memory.

2. Description of the Related Art

Unless otherwise indicated herein, the approaches described in this section are not prior art to the claims in this application and are not admitted to be prior art by inclusion in this section.

Digitization of content not only provides new ways to distribute and commercialize content, but it also enables new and easier ways to violate copyright or to steal or misuse premium content such as feature films. To combat rampant piracy of digital content, some content providers have developed advanced content protection schemes in digital medium such as laser disks and cable/satellite TV, and impose strict requirements on the licensees of such conveyance schemes in order to safeguard their premium content. For example, the content protection licenses for popular content formats and mediums, such as Digital Versatile Disc ("DVD"), Blu-ray, High Definition ("HD") DVD, Fairplay, and OpenCable, include requirements of safeguarding the handling and protection of content during the decode process to prevent unintended interception and copying.

However, conventional computer systems fail to cost effectively provide the end-of-end content protection as required in the aforementioned licenses. To illustrate, FIG. 1 is a simplified block diagram of such a conventional computer system 100 handing content with two main processing units, a central processing unit ("CPU") 102 and a graphics processing unit ("GPU") 114 that operates in a GPU front-end domain 108. To play back content, the CPU 102 executes the instructions of a content player, such as the Windows Media Player, and interacts with the GPU front-end domain 108 via a Peripheral Component Interface Express ("PCIe") interface 106. Typically, this content is partially decoded by the content player and also partially decoded by the GPU 114. The scheme of distributing these decoding tasks is commonly referred to as the distributed decode model. After the content player hands over the partially decoded content to the GPU 114 for the final decoding and rendering, the content briefly resides in the physical memory space 112. Depending on the configuration of the computer system 100, the physical memory space 112 here may include system memory, memory local to the GPU 114, or a combination of these two different memory systems. Since the PCIe interface 106 is a public and unsecured interface, whenever the CPU 102 and the GPU front-end domain 108 pass information such as the memory pointers to this temporarily stored content in the physical memory space 112 between one another through this interface, the information is susceptible to eavesdropping and interception. Once intercepted, a rogue agent can proceed to acquire the location of the content, retrieve the content out of the physical memory space 112 as it is being played, and copy the content into off-line storage. Similarly, after the GPU 114 finishes decoding and rendering and presents the content to backend connections 118, such as High-Definition Multimedia Interface ("HDMI"), for display on a display device 120, the content may also be intercepted midstream.

One conventional approach to counter the unwanted interception and copying of content as it travels from one component of the computer system 100 to another is to encrypt the content in transit. For example, in the GPU front-end domain 108, the GPU 114 needs to encrypt any part of the content to be stored in the physical memory space 112. Also, in the backend connections 118, a stream cipher is needed to encrypt the content before it reaches HDMI. However, whenever the content is encrypted, it needs to be decrypted before it can be processed further. Therefore, rendering a pixel in the encrypted content necessarily requires the additional steps of decrypting data, processing data, and re-encrypting data for storage in a frame buffer before scanning out the entire frame. Not only does repeatedly performing these steps negatively impact the overall performance of the computer system 100, but it also increases the cost of the computer system 100 because of the need for additional resources, such as processing and storage capacity, to perform the steps. Further complicating the matter, this conventional approach lacks any intelligence to discern protected content from unprotected content and thus needs to encrypt both types of content even when it is not necessary to do so. For instance, suppose a content player is playing protected content, such as a movie clip, in a content player window on a Windows desktop. Suppose further that other than this content player window, the Windows desktop itself only contains unprotected content, such as icons. The conventional approach here still encrypts not only the movie clip in the content player window, but also encrypts the entire Windows desktop. The significant overhead associated with encrypting and decrypting unprotected content leads to further deterioration of the performance of the computer system 100.

As the foregoing illustrates, what is needed in the art is a method and system for protecting content in graphics memory without having to rely on encryption and decryption mechanisms and addressing at least the shortcomings of the prior art approaches set forth above.

SUMMARY OF THE INVENTION

A method and system for protecting content in graphics memory are disclosed. Specifically, one embodiment of the present invention sets forth a method, which includes the steps of storing a first privilege level in a privilege map with restricted access, wherein the first privilege level is associated with a memory page used to store the content; and determining whether to permit a request to access the memory page based on the first privilege level.

One advantage of the disclosed method and system is to safeguard protected content without having to repeatedly encrypt and decrypt such content as it travels from one component in the GPU domain to another.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
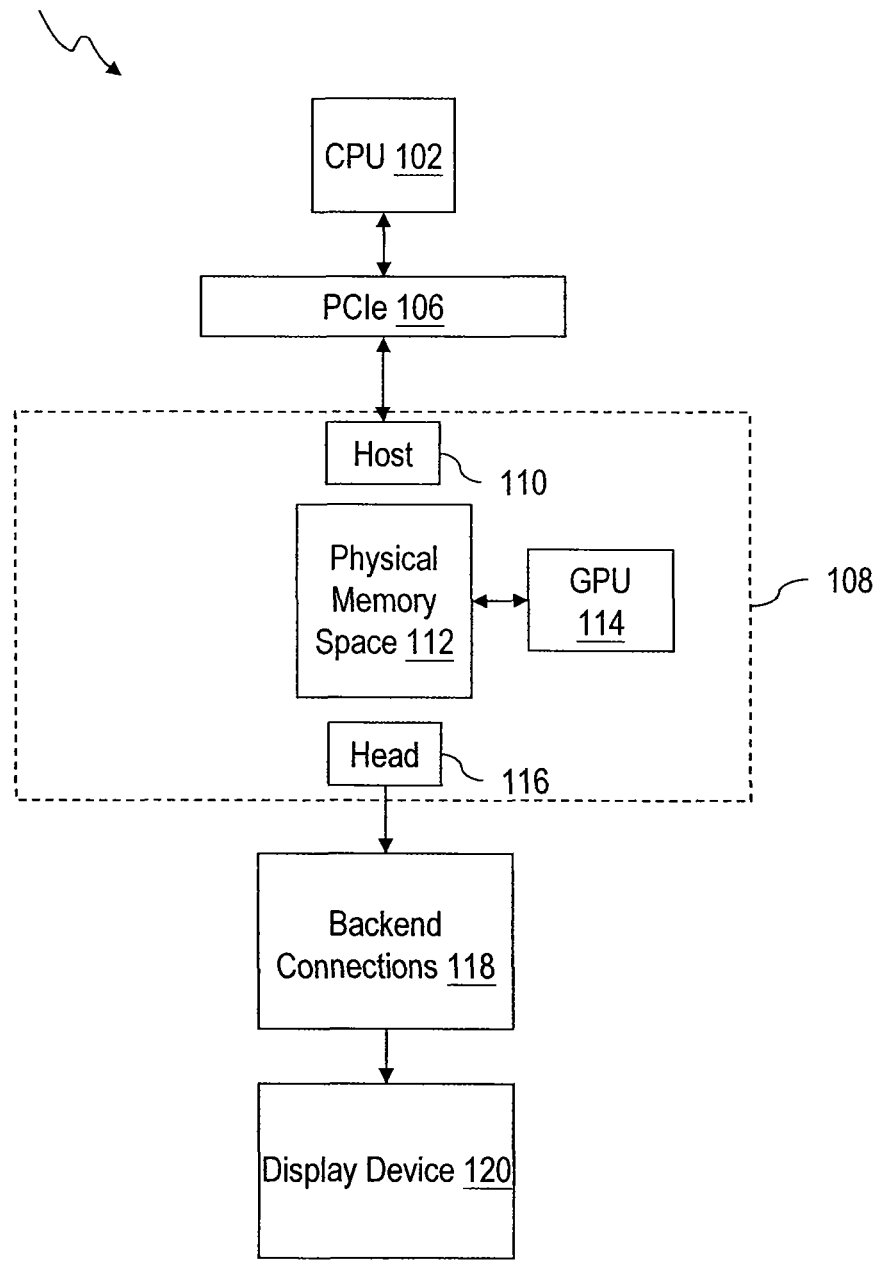
FIG. 1 is a simplified block diagram of a conventional computer system that handles content with two main processing units, a central processing unit ("CPU") and a graphics processing unit ("GPU") that operates in a GPU front-end domain.
Figure 2A:
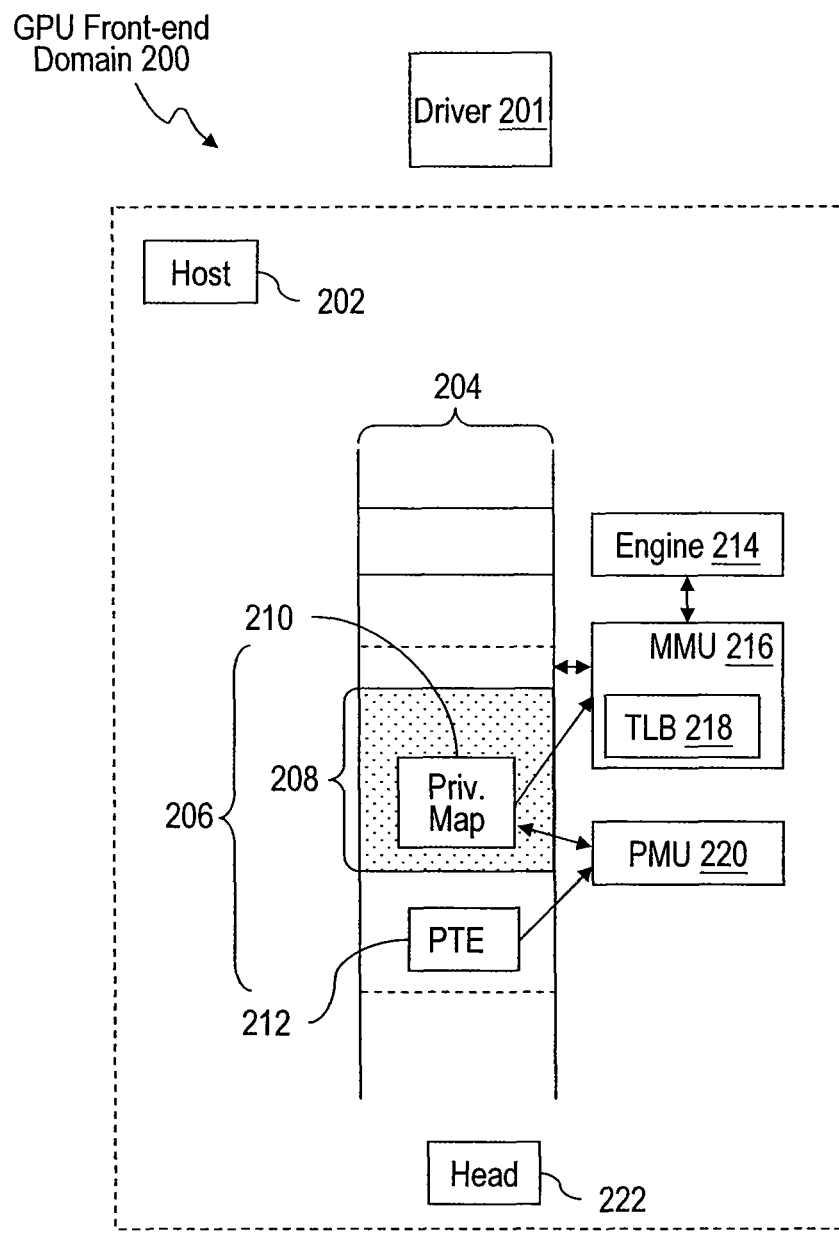
FIG. 2A is a simplified block diagram of an exploded view of a GPU front-end domain, according to one embodiment of the present invention.

FIG. 2A is a simplified block diagram of an exploded view of a GPU front-end domain 200, according to one embodiment of the present invention. Within privileged memory 206 of physical memory space 204 in this domain, a carve-out region 208 with the highest level of privilege is allocated. It should be noted that "privileged memory" here broadly refers to a set of memory locations for which the GPU can enforce access control according to privileges. The carve-out region 208 is inaccessible to an engine 214 of a GPU, such as a rendering engine or a video processing engine, or a CPU interacting with the GPU front-end domain 200. Instead, in one implementation, only a privilege management unit ("PMU") 220 and a memory management unit ("MMU") 216 have access to this region, and only the PMU 220 can modify the region. In addition, the carve-out region 208 contains a privilege map 210, which includes privilege level information associated with memory pages in the privileged memory 206. With the privilege level information, the MMU 216 can then apply certain privilege rules to ensure the storing of content in secured locations in the physical memory space 204 without having to rely on the encryption schemes as mentioned above.

Figure 2B:
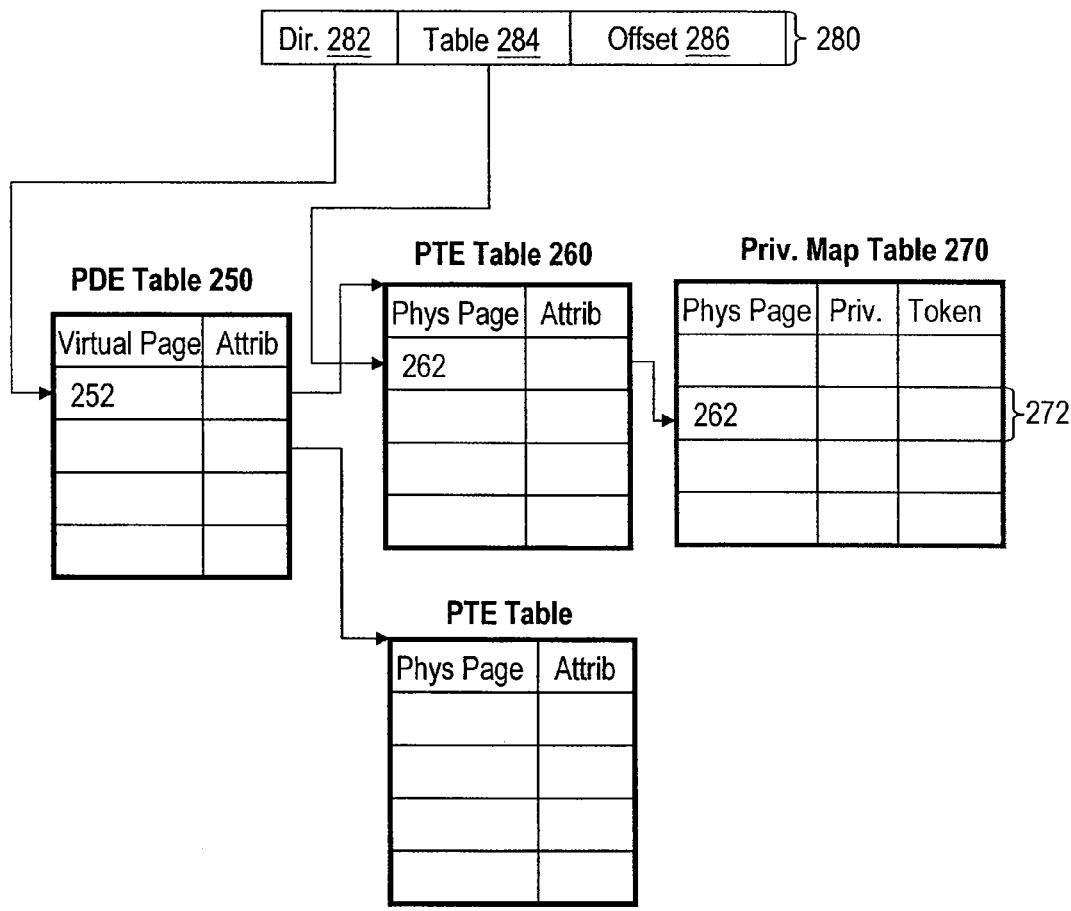
FIG. 2B is a simplified conceptual diagram illustrating the relationships among a page directory entry ("PDE") table, a page table entry ("PTE") table, and a privilege map table, according to one embodiment of the present invention.

FIG. 2B is a simplified conceptual diagram illustrating the relationships among a page directory entry ("PDE") table 250, a page table entry ("PTE") table 260, and a privilege map table 270, according to one embodiment of the present invention. The use of the PDE tables and the PTE tables is generally to support virtual mapping schemes. It should be apparent to a person with ordinary skills in the art to recognize that other mapping schemes exist and FIG. 2B and the related discussions below shall not be construed restrictively. As an illustration, to map a virtual address 280 to a physical address, one of its fields, a field 282, is first used to point to a virtual page 252 in the PDE table 250, and the virtual page 252 further maps to the PTE table 260. Then, another field of the virtual address 280, a table field 284, is used to point to a physical page 262 in the PTE table 260. The last field of the virtual address 280, an offset field 286, is used to point to a particular physical address within the physical page 262. Corresponding to the physical page 262, the privilege map table 270 contains a privilege map entry 272. The privilege map entry 272 includes information such as, without limitation, privilege level information and session information. Some examples of the privilege level information include host read ("R"), host write ("W"), allow re-use ("M"), allow engine read/write ("B"), allow display ("D"), and allow copy ("C"). Some examples of the session information include token identification and session identification.

Figure 3:
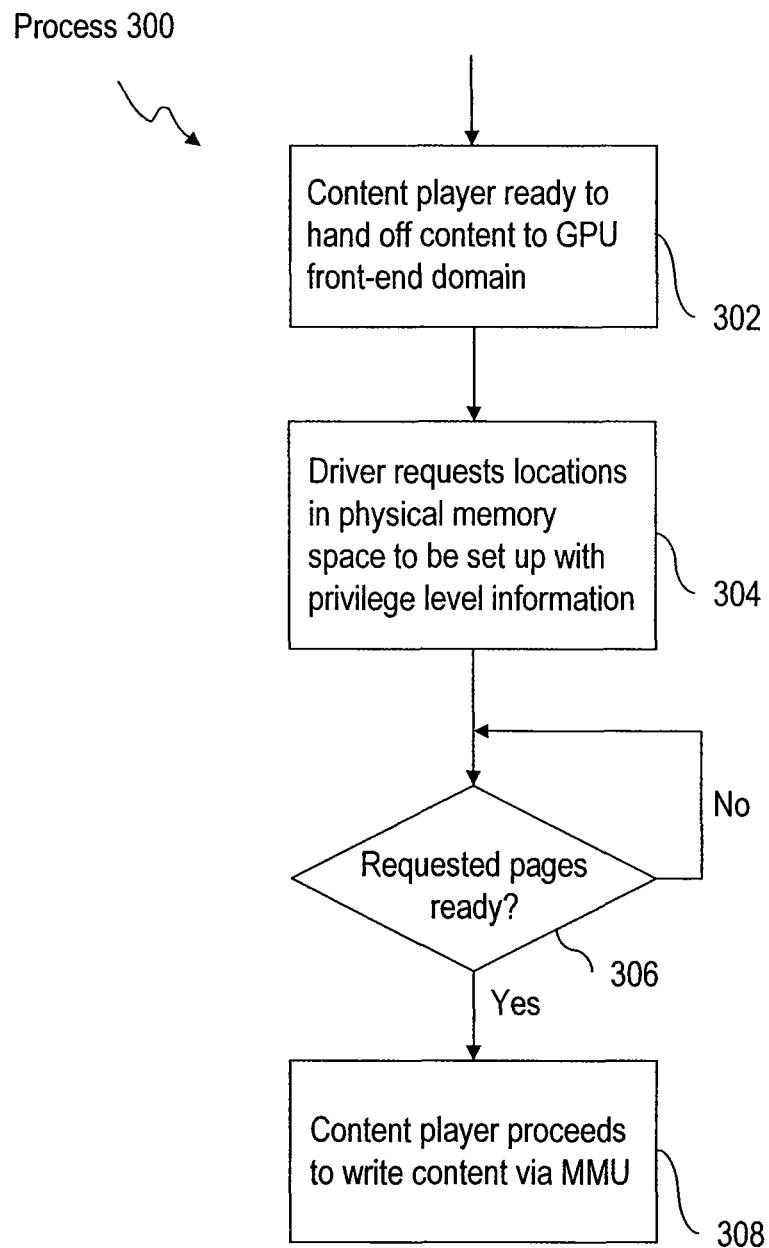
FIG. 3 is a flow chart illustrating a process of allocating privileged memory locations within physical memory space, according to one embodiment of the present.

In one implementation, a driver 201 responsible for the GPU front-end domain 200 shown in FIG. 2A sets up and maintains the mappings among the tables shown in FIG. 2B. The driver 201 also interacts with the PMU 220 to cause certain physical pages to be marked with appropriate privilege levels. Specifically, FIG. 3 is a flow chart illustrating a process 300 of allocating privileged memory locations within the physical memory space 204 shown in FIG. 2A, according to one embodiment of the present invention. Suppose a content player, as a client of the GPU front-end domain 200, finishes the decoding of a movie clip and is ready to hand over the processed movie clip in step 302. In one implementation, the content player hands over information such as, without limitation, the size and the number of pages for the movie clip and also the session information and the privilege level associated with this movie clip to the driver 201. With the knowledge of availability in the physical memory space 204 and some relevant information of the movie clip, in step 304, the driver 201 requests the MMU 216 to allocate some of the available memory pages for the movie clip and also requests the PMU 220 to annotate appropriate privilege information associated with these allocated memory pages in the privilege map 210. If the memory pages are successfully allocated and the association of the privilege level information is also completed, the driver 201 informs the content player, and the content player proceeds to write the movie clip via the MMU 216 to the allocated and privileged memory pages in step 308.

Figure 4:
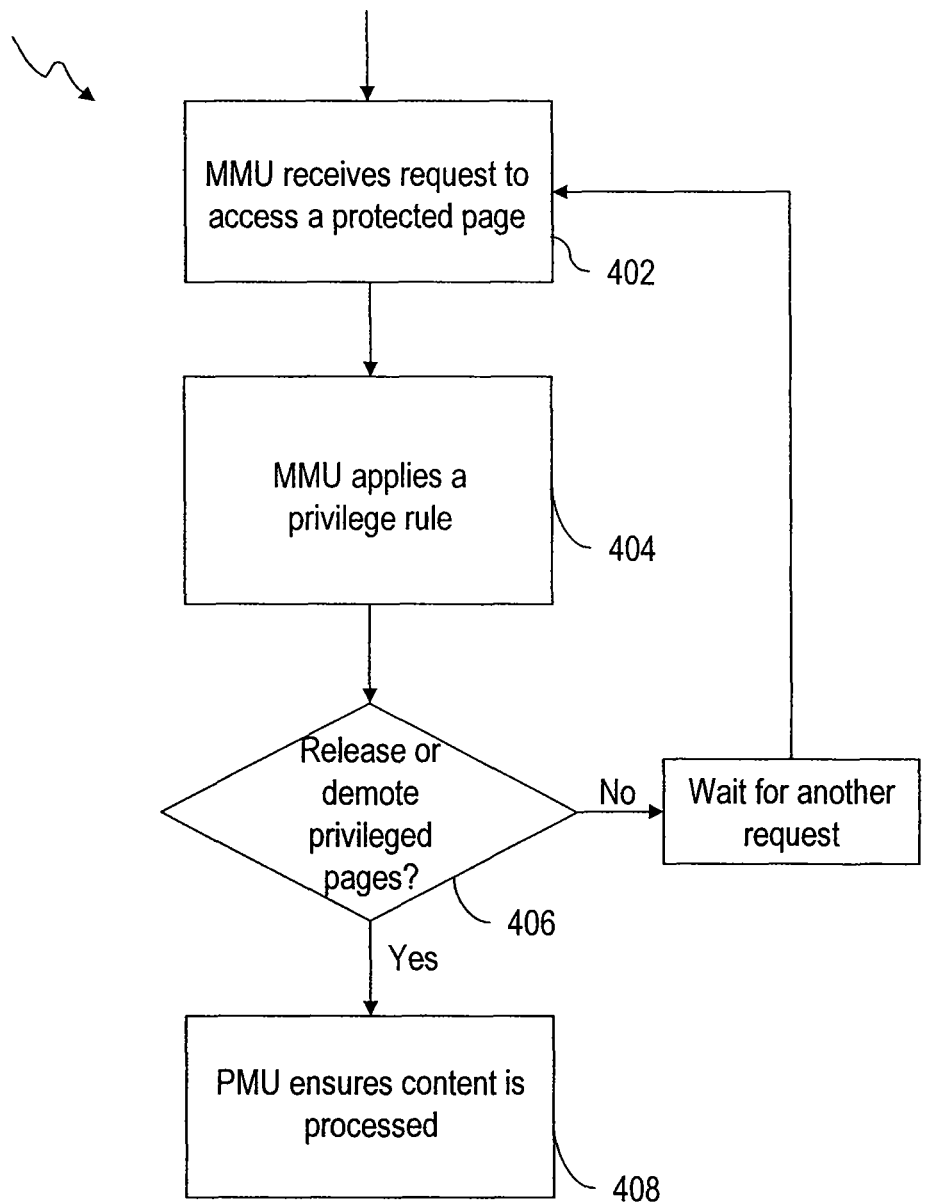
FIG. 4 is a flow chart illustrating a process of enforcing the privilege levels specified in a privilege map from the perspective of a GPU front-end domain, according to one embodiment of the present invention.

FIG. 4 is a flow chart illustrating a process 400 of enforcing the privilege levels specified in the privilege map 210 of FIG. 2A from the perspective of the GPU front-end domain 200, according to one embodiment of the present invention. Suppose the engine 214 is a rendering engine and is requesting to copy some of the movie clip from a source memory page to a destination memory page. The MMU 216 receives the request in step 402 and applies a privilege rule in step 404. In one implementation, the MMU 216 compares the privilege level associated with the source memory page against the privilege level of the destination memory page to determine whether the requested access is permissible. If the privilege level associated with the destination memory page is higher than or equal to the privilege level associated with the source memory page, then the request is granted. This is referred to as the equivalence based privilege rule. In another implementation, if the privilege level associated with the destination memory page is lower than the privilege level associated with the source memory page, then the MMU 216 involves the PMU 220 to set the privilege level associated with the destination memory page to equal to the privilege level associated with the source memory page in the privilege map 210. In other words, the destination memory page here inherits the privilege level associated with the source memory page. This approach is referred to as the inheritance based rule. In yet another implementation, based on some session related information, such as a token identifying a particular session, the engine 214 is first placed in a protected transfer mode, and the MMU 216 ensures that all data transfers follow the equivalence based privilege rule discussed above while in the protected transfer mode. This is referred to as the session based rule.

To further speed up the execution of any of the above privilege rules, in one implementation, the MMU 216 uses a translation look-aside buffer ("TLB") 218 to store the entries of the privilege map 210. So, when the MMU 216 compares the privilege levels according to the privilege rules, it does not always need to access the privilege map 210 in the physical memory space 204 but can instead quickly accesses the cached privilege level information in the TLB 218. One implementation of the MMU 216 loads the privilege map 210 into the TLB 218 every time the TLB 218 flushes.

If a request to access a privileged memory page fails any of the privilege rules, then the MMU 216 either discards the request or returns values that do not at all resemble the content in the page. In one implementation, the MMU 216 also causes an interrupt to dispatch and alerts the driver 201 of the failed attempt to access the privileged memory page. If a privileged memory page is determined to be released or demoted in step 406, one implementation of the PMU 220 ensures the content in the privileged memory page is processed in step 408 before recycling back to the pool of unprotected system memory pages. Specifically, before the privileged memory page is released, the content in the page is cleared out so that content is not recoverable from the page. On the other hand, before a privileged memory page is demoted but yet still retaining its privilege, then the PMU 220 in one implementation encrypts the content so that despite being stored in an unprotected location, the content is still protected.

Figure 5A:
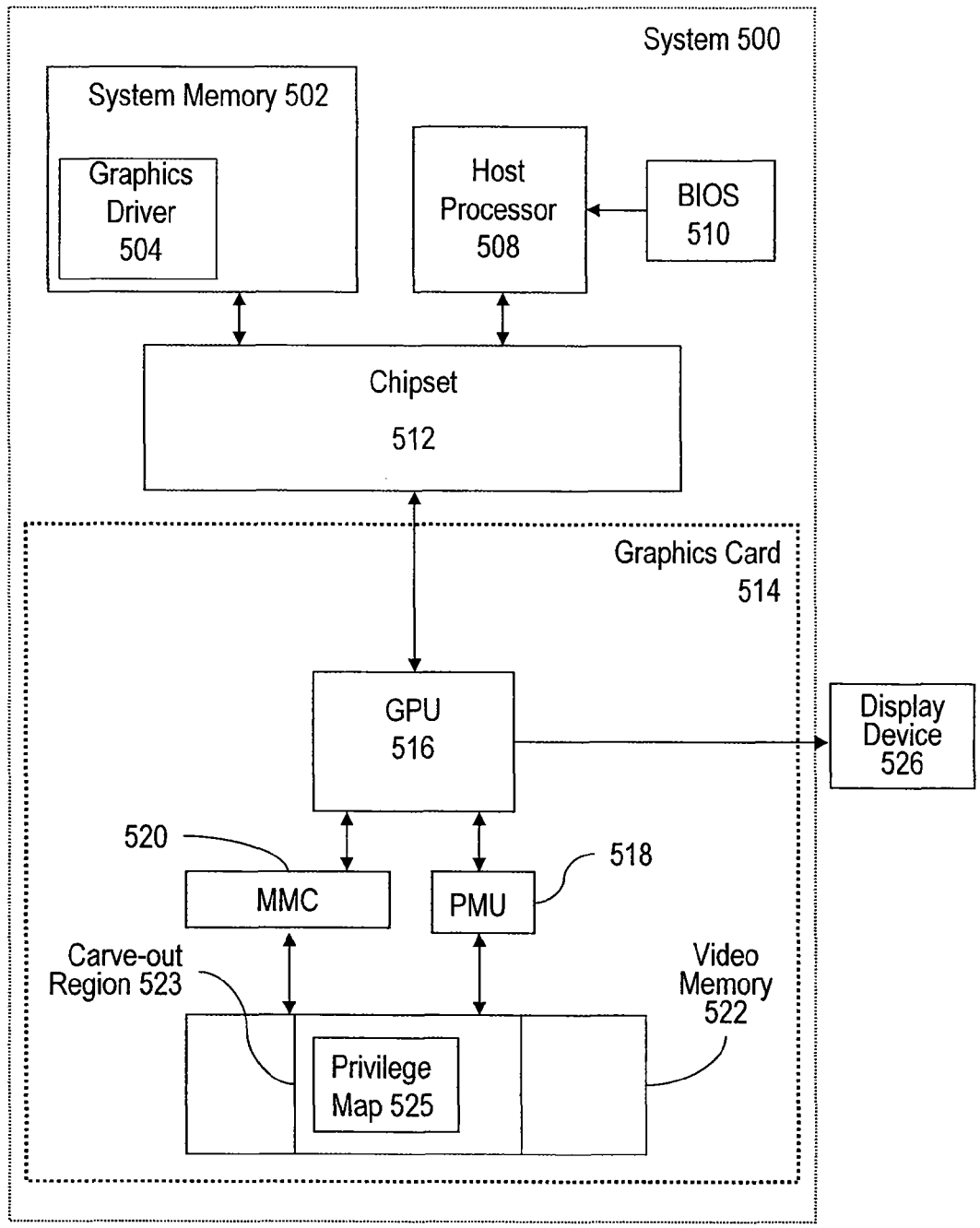
FIG. 5A is a simplified block diagram of a graphics card in a computing device supporting the memory hierarchy of privileged memory, a carve-out region, and a privilege map, according to one embodiment of the present invention.

Different system configurations support the memory hierarchy of the physical memory space 204, the privileged memory 206, the carve-out region 208, and the privilege map 210 of FIG. 2A. FIG. 5A is a simplified block diagram of a graphics card 514 in a computing device 500 supporting such a memory hierarchy, according to one embodiment of the present invention. Without limitation, the computing device 500 may be a desktop computer, server, laptop computer, palm-sized computer, tablet computer, game console, cellular telephone, hand-held device, mobile device, computer based simulator, or the like. The computing device 500 includes a host processor 508, BIOS 510, system memory 502, and a chipset 512 that is directly coupled to the graphics card 514. The BIOS 510 is a program stored in read only memory ("ROM") or flash memory that is run at bootup. The graphics card 514 includes a GPU 516.

A graphics driver 504, stored within the system memory 502, configures the GPU 516 to share the graphics processing workload performed by the computing device 500 and communicate with applications that are executed by the host processor 508. In one embodiment, the graphics driver 504 generates and places a stream of commands in a "push buffer." When the commands are executed, certain tasks, which are defined by the commands, are carried out by the GPU. Here, the graphics driver 504 in one implementation corresponds to the driver 201 of FIG. 2A.

In some embodiments of the computing device 500, the chipset 512 provides interfaces to the host processor 508, memory devices, storage devices, graphics devices, input/output ("I/O") devices, media playback devices, network devices, and the like. It should be apparent to a person skilled in the art to implement the chipset 512 in two or more discrete devices, each of which supporting a distinct set of interfaces.

The GPU 516 is responsible for outputting image data to a display device 526. The display device 526 may include one or more display devices, such as, without limitation, a cathode ray tube ("CRT"), liquid crystal display ("LCD"), plasma display, liquid crystal on silicon ("LCOS"), or the like. The GPU 516 is also coupled to a PMU 518, a MMC 520, and video memory 522, each of which in one embodiment corresponds to the PMU 220, the MMC 216, and the privileged memory 206 as shown in FIG. 2A, respectively. Here, from the perspective of the GPU 516, the entire physical memory space of the computer device 500 is the combination of the system memory 502 and the video memory 522. However, because the video memory 522 is directly accessible by the GPU and is only accessible to the host processor 508 through the GPU 516, the video memory 522 is viewed as the privileged memory. Within the local memory 522, a carve-out region 523 in one implementation corresponds to the carve-out region 208, and a subset of the carve-out region 523, a privilege map 525, corresponds to the privilege map 210. It is worth noting that the PMU 518 can be a distinct microcontroller unit, a dedicated engine embedded in the GPU 516, or other devices. It is also worth noting that the privilege map may be associated with a distinct memory buffer such as available through an on-chip static random access memory ("SRAM").

Figure 5B:
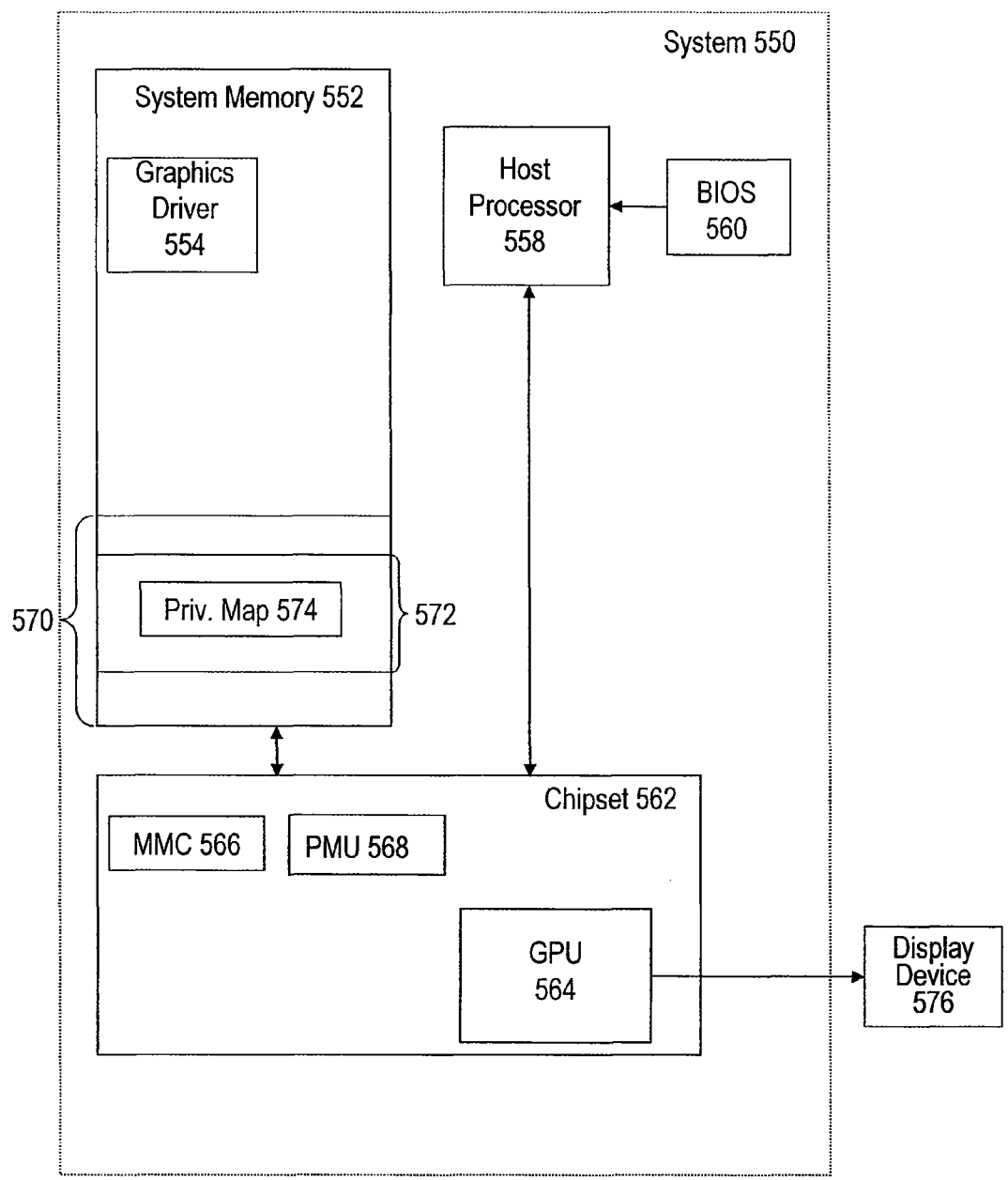
FIG. 5B is another simplified block diagram of an integrated chipset in a computing device also supporting the memory hierarchy of privileged memory, a carve-out region, and a privilege map, according to one embodiment of the present invention.

FIG. 5B is another simplified block diagram of an integrated chipset 562 in a computing device 550 also supporting the memory hierarchy detailed above, according to one embodiment of the present invention. Here, a GPU 564 resides in the integrated chipset 562 and accesses system memory 552 along with a host processor 558 and other devices in the computing device 550. From the perspective of the GPU 564, the entire physical memory space in this configuration is the system memory 552. In one implementation, a carve-out of the system memory 552, privileged memory 570, is allocated to correspond to the privileged memory 206 of FIG. 2 A. Then, within the privileged memory 570, a carve-out region 572 in one implementation corresponds to the carve-out region 208, and a subset of the carve-out region 572, a privilege map 574, corresponds to the privilege map 210.

Figure 6A:
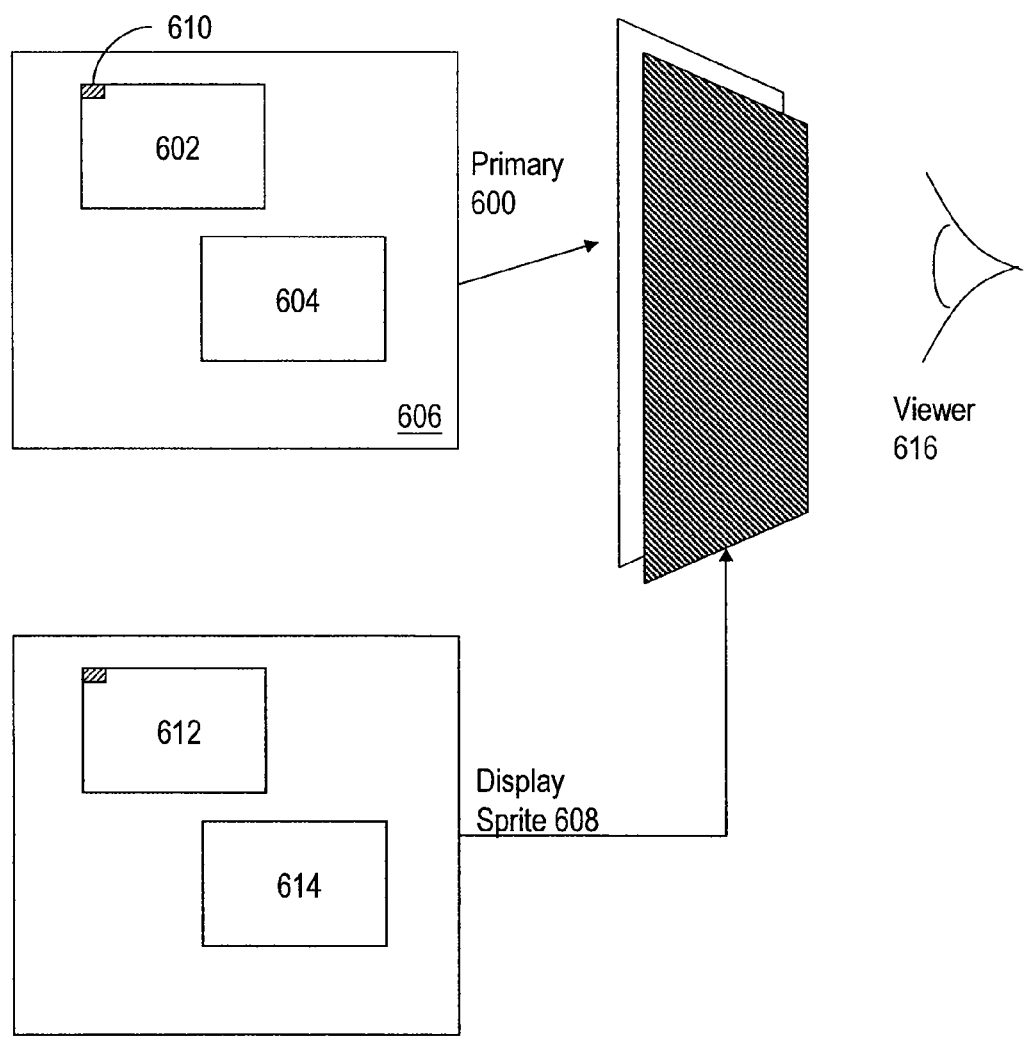
FIG. 6A is a conceptual diagram illustrating the overlaying of windows containing privileged surfaces over an unprotected primary surface, according to one embodiment of the present invention.

When displaying a mixture of privilege levels such as for graphical user interfaces which include windows containing a mixture of protected and unprotected content, one implementation of a GPU, such as the GPU 516 of FIG. 5A or the GPU 564 of FIG. 5B, supports two or more display sprites, or two dimensional display planes, which are fed from each privilege level memory surfaces. FIG. 6A is a conceptual diagram illustrating the overlaying of windows 612 and 614 containing privileged surfaces over an unprotected primary surface 600, according to one embodiment of the present invention. Here, the unprotected primary surface 600 and the privileged surfaces are blended or merged together during the display process by applying a z-level testing according to the privilege levels. So, from the perspective of a viewer 616, although higher and lower privilege level pixels may occupy the same coordinate space, only the pixels of the highest privilege level will be visible.

Figure 6B:
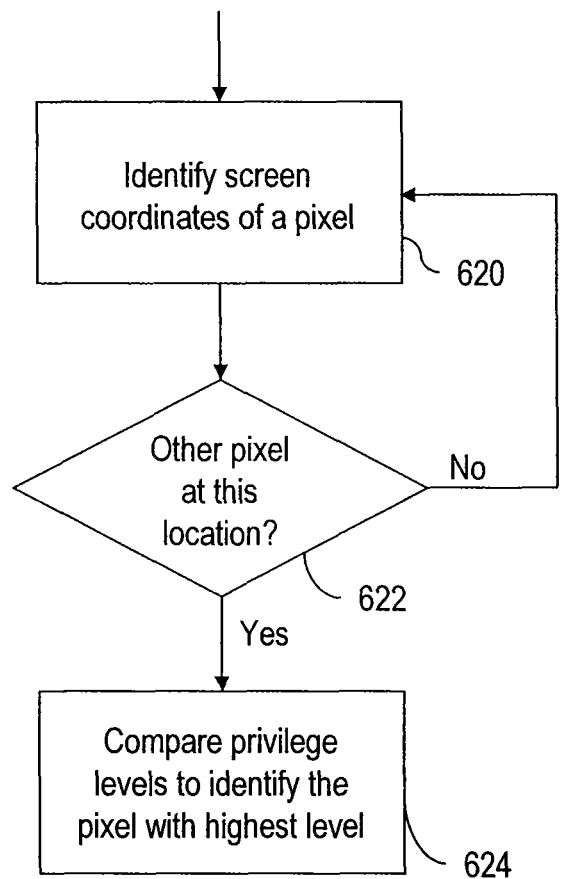
FIG. 6B is a simplified flow chart illustrating method steps for identifying the pixel with the highest privilege level, according to one embodiment of the present invention.

FIG. 6B is a simplified flow chart illustrating method steps for identifying the pixel with the highest privilege level, according to one embodiment of the present invention. In conjunction with FIG. 6A, suppose the primary surface 600 serves as the background of a windows desktop. Windows 602 and 604 correspond to areas on the windows desktop configured to play back some protected content, such as premium movies A and B, respectively, but is currently playing back some default and unprotected content. The windows 612 and 614 correspond to the same screen coordinates as the windows 602 and 604 and contain the privileged surfaces associated with the premium movies A and B, respectively. During the display process, a GPU, such as the GPU 516 of FIG. 5A, identifies a set of screen coordinates 610 in step 620. Before proceeding to display the pixel at the screen coordinates 610, the GPU 516 checks whether there is another pixel from a privileged surface in step 622. In one implementation, an additional flag stored in an independent map or with the privileged pixel enables this determination. If a higher privilege level pixel is present at the screen coordinates 610, then the GPU 516 compares the privilege levels of all the pixels at the same location to identify the pixel with the highest privilege level in step 624. Here, the pixel with the same screen coordinates 610 in the window 612 has the highest privilege. As a result, the display sprite 608 blends with the primary surface 600 and the blended result is delivered to a head, or a display content stream, to be presented to a display device for display. The pixel in the window 612 at the screen coordinates 610 is then visible to the viewer 616, not the pixel in the window 602. By using the aforementioned process, the windows 612 and 614 playing back premium movies A and B along with the windows desktop are visible to the viewer 616, not the unprotected content playing back in the windows 602 and 604.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the above examples, embodiments, and drawings should not be deemed to be the only embodiments, and are presented to illustrate the flexibility and advantages of the present invention as defined by the following claims.

I claim:

1. A method for blending a privileged surface and a non-privileged surface, the method comprises:
    storing a first privilege level in a privilege map within a privileged memory, wherein:
        the privilege map has restricted access;
        the privileged memory comprises a privileged memory space within a memory unit local to a processing unit; and
        the first privilege level is associated with a memory page within the privileged memory used to store the privileged surface;
    determining whether to permit a request to access the memory page based on the first privilege level;
    identifying a first pixel in the privileged surface and a second pixel in a non-privileged surface, wherein the first pixel and the second pixel are associated with a same location; and
    overlaying the first pixel over the second pixel based on the results of comparing a first privilege level of the first pixel with a second privilege level of the second pixel.

2. The method of claim 1, further comprising:
    presenting the privileged surface via a display sprite; and
    blending the display sprite with the non-privileged surface to deliver to a display content stream.

3. The method of claim 1, further comprising tracking whether there are multiple pixels associated with the same location in an independent map.

4. The method of claim 1, further comprising tracking whether there are multiple pixels associated with the same location along with the first pixel.

5. The method of claim 1, further comprising:
    before evicting a graphics memory page associated with the first privilege level back to a pool of unprotected system memory pages, encrypting the content in the graphics memory page to be placed into the pool of unprotected system memory pages.

6. The method of claim 5, further comprising permitting a request to decrypt the encrypted content in the graphics memory page after determining if a second privilege level associated with a destination memory page is higher than or equal to the first privilege level.

7. The method of claim 5, further comprising:
    permitting a request to access the encrypted content in the graphics memory page after determining if a second privilege level associated with a destination memory page is lower than the first privilege level by encrypting the result in the destination memory page;
    modifying the second privilege level to establish a third privilege level so that the third privilege level equals to the first privilege level; and
    maintaining the third privilege level in the privilege map.

8. The method of claim 1, wherein a privilege management unit ("PMU") maintains the first privilege level associated with the memory page used to store the privileged surface in the privilege map, and wherein a memory manage unit ("MMU") determines whether to permit a request to access the memory page based on the first privilege level stored in the privilege map.

9. A graphics subsystem configured to blend a privileged surface and a non-privileged surface, the graphics subsystem comprises:
    a privilege management unit ("PMU") configured to maintain a first privilege level associated with a memory page used to store the privileged surface in a privilege map;
    a memory manage unit ("MMU") configured to determine whether to permit a request to access the memory page based on the first privilege level stored in the privilege map, wherein the privilege map is accessible only by the PMU and the MMU;
    a graphics processing unit ("GPU") configured to identify a first pixel in the privileged surface and a second pixel in a non-privileged surface, wherein the first pixel and the second pixel are associated with a same location; and
    the GPU configured to overlay the first pixel over the second pixel based on the results of comparing a first privilege level of the first pixel with a second privilege level of the second pixel.

10. The graphics subsystem of claim 9, wherein the GPU is further configured to:
    present the privileged surface via a display sprite; and blend the display sprite with the non-privileged surface to deliver to a display content stream.

11. The graphics subsystem of claim 9, wherein the MMU is further configured to track whether there are multiple pixels associated with the same location in an independent map.

12. The graphics subsystem of claim 9, wherein the MMU is further configure to track whether there are multiple pixels associated with the same location along with the first pixel.

13. The graphics subsystem of claim 9, wherein the MMU is further configured to:
before evicting a graphics memory page associated with the first privilege level back to a pool of unprotected system memory pages, encrypt the content in the graphics memory page to be placed into the pool of unprotected system memory pages.

14. The graphics subsystem of claim 13, wherein the MMU is further configured to permit a request to decrypt the encrypted content in the graphics memory page after determining if a second privilege level associated with a destination memory page is higher than or equal to the first privilege level.

15. The graphics subsystem of claim 13, wherein the MMU is further configured to:
permit a request to access the encrypted content in the graphics memory page after determining if a second privilege level associated with a destination memory page is lower than the first privilege level by
encrypting the result in the destination memory page;
modifying the second privilege level to establish a third privilege level so that the third privilege level equals to the first privilege level; and
maintaining the third privilege level in the privilege map.

16. The graphics subsystem of claim 9, wherein the privileged map is stored in a privileged memory space within a memory unit local to a processing unit.

17. A computing device configured to blend a privileged surface and a non-privileged surface, the computing device comprises:
a host processing unit,
a system memory module, and
a graphics subsystem, wherein the graphics subsystem further includes:
a privilege management unit ("PMU") configured to maintain a first privilege level associated with a memory page used to store the privileged surface in a privilege map;
a memory manage unit ("MMU") configured to determine whether to permit a request to access the memory page based on the first privilege level stored in the privilege map, wherein the privilege map is accessible only by the PMU and the MMU;
a graphics processing unit ("GPU") configured to identify a first pixel in the privileged surface and a second pixel in a non-privileged surface, wherein the first pixel and the second pixel are associated with a same location; and
the GPU configured to overlay the first pixel over the second pixel based on the results of comparing a first privilege level of the first pixel with a second privilege level of the second pixel.

18. The computing device of claim 17, wherein the GPU in the graphics subsystem is further configured to:
present the privileged surface via a display sprite; and
blend the display sprite with the non-privileged surface to deliver to a display content stream.

19. The computing device of claim 17, where the GPU in the graphics subsystem is further configured to track whether there are multiple pixels associated with the same location in an independent map.

20. The computing device of claim 17, wherein the MMU in the graphics subsystem is further configured to:
before evicting a graphics memory page associated with the first privilege level back to a pool of unprotected memory pages in the system memory module, encrypt the content in the graphics memory page to be placed into the pool of unprotected memory pages.

21. The computing device of claim 20, wherein the MMU in the graphics subsystem is further configured to permit a request to decrypt the encrypted content in the graphics memory page after determining if a second privilege level associated with a destination memory page is higher than or equal to the first privilege level.

22. The graphics subsystem of claim 20, wherein the MMU is further configured to:
permit a request to access the encrypted content in the graphics memory page after determining if a second privilege level associated with a destination memory page is lower than the first privilege level by:
encrypting the result in the destination memory page;
modifying the second privilege level to establish a third privilege level so that the third privilege level equals to the first privilege level; and
maintaining the third privilege level in the privilege map.

* * * * *